UNITED STATES PATENT OFFICE.

LUCIEN JUMAU, OF PARIS, FRANCE.

PROCESS OF OBTAINING PURE METALLIC COPPER FROM A SOLUTION OF A SALT OF COPPER.

No. 930,967.  Specification of Letters Patent.  Patented Aug. 10, 1909.

Original application filed January 19, 1907, Serial No. 353,064. Divided and this application filed April 21, 1908. Serial No. 428,412.

*To all whom it may concern:*

Be it known that I, LUCIEN JUMAU, a citizen of France, residing at Paris, in the said Republic, have invented new and useful Improvements in Processes for Obtaining Pure Metallic Copper from a Solution of a Salt of Copper, for which I have obtained a patent of addition in France, No. 6,825, bearing date October 27, 1906, of which the following is a specification.

The present application is a division of an application, Serial No. 353,064, filed January 19, 1907, for Letters Patent of the United States.

My invention relates to an improved process for obtaining pure metallic copper from a solution of a salt of copper, and it consists in the steps and processes herein described and claimed.

In the usual wet method of extracting copper from its ores, the ores, with or without, previous roasting are leached with a suitable solution for dissolving the copper, the latter being usually extracted in the form of a sulfate.

According to my improved process, the solution containing salts of copper is heated, under pressure, to a high temperature in the presence of sulfurous acid; in this process, the copper is precipitated from the solution in the form of pure metallic copper, and the sulfurous acid is oxidized to sulfuric acid, according to the equation:

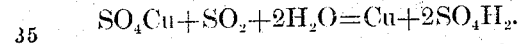
$$SO_4Cu + SO_2 + 2H_2O = Cu + 2SO_4H_2.$$

When a solution containing salts of copper is thus heated under pressure, in the presence of sulfurous acid, the percentage of copper precipitated in a pure metallic form increases as the temperature is raised. As an example, in a copper sulfate solution having originally a concentration of twenty-five grams per liter, the percentage of copper precipitated in a pure metallic form will be increased by raising the temperature substantially as follows:—

| Temperatures. | Copper precipitated. |
|---|---|
| 140° C | 47% |
| 155° C | 62% |
| 167° C | 65% |
| 190° C | 79% |

Therefore, the employment of a temperature as high as possible is essential to the operation of my process and my invention has just for its object a process by which the utilization of such high temperatures will not be impracticable by a corresponding increase in the pressure engendered thereby. In fact, when treating solutions saturated with sulfurous acid, the pressure increases rapidly with the temperature, not only owing to the pressure of aqueous vapor corresponding with the concentration and the temperature, but to the pressure engendered by the sulfurous acid.

In order to permit the employment of high temperature without attaining such a high pressure, the latter is diminished, according to my improved process, either by introducing into the solution only that quantity of sulfurous acid which corresponds with the theoretical equation above mentioned, without attaining saturation, and then heating the whole gradually; or by first heating the solution, without sulfurous acid, and then introducing the latter as gas under pressure in such a manner as to add gradually only the theoretical quantity, the said addition being made in proportion as the sulfurous acid becomes sulfuric acid.

I have described my preferred process, but, obviously, changes could be made within the spirit and scope of my invention.

Having thus described my invention, what I claim as new and desire to secure by Letters-Patent is:

1. The process of precipitating copper from a copper sulfate solution, which consists in subjecting the said solution to a high temperature, adding thereto sulfurous acid and maintaining a safe pressure by so proportioning the amount of the added acid as to satisfy the chemical equivalents, without saturation.

2. The process of reducing copper from a copper sulfate solution which consists in subjecting the said solution to the action of heat and pressure, in the presence of sulfurous acid, and gradually increasing the temperature of the mingled ingredients.

In testimony whereof, I have signed my name to this specification in the presence of two subscribing witnesses.

LUCIEN JUMAU.

Witnesses:
JULES FAYOLLET,
EUGÈNE PICHON.